(12) United States Patent
Hsieh et al.

(10) Patent No.: US 8,279,515 B2
(45) Date of Patent: Oct. 2, 2012

(54) ELECTROPHORETIC DISPLAY

(75) Inventors: Ming-Che Hsieh, Hsin-Chu (TW);
Shih-Hsing Hung, Hsin-Chu (TW);
Chih-Jen Hu, Hsin-Chu (TW)

(73) Assignee: Au Optronics Corporation, Hsin-Chu (TW)

(*) Notice: Subject to any disclaimer, the term of this patent is extended or adjusted under 35 U.S.C. 154(b) by 0 days.

(21) Appl. No.: 13/115,206

(22) Filed: May 25, 2011

(65) Prior Publication Data
US 2011/0292492 A1    Dec. 1, 2011

(30) Foreign Application Priority Data

May 26, 2010    (TW) ................................ 99116789 A

(51) Int. Cl.
*G02B 26/00* (2006.01)
*G09G 3/34* (2006.01)
(52) U.S. Cl. ....................................... 359/296; 345/107
(58) Field of Classification Search .................. 359/296, 359/452; 345/107; 156/64, 267, 275.5; 204/451, 204/456, 601, 605; 427/58; 438/22
See application file for complete search history.

(56) References Cited

U.S. PATENT DOCUMENTS

| 6,738,050 | B2 | 5/2004 | Comiskey et al. | |
| 7,233,429 | B2* | 6/2007 | Liang et al. | 359/296 |
| 7,324,264 | B2* | 1/2008 | Aylward et al. | 359/296 |
| 7,667,886 | B2* | 2/2010 | Danner et al. | 359/296 |
| 7,688,497 | B2* | 3/2010 | Danner et al. | 359/296 |
| 8,009,344 | B2* | 8/2011 | Danner et al. | 359/245 |
| 2005/0168801 | A1 | 8/2005 | O'Neil et al. | |

FOREIGN PATENT DOCUMENTS

CN    1910496    2/2007

* cited by examiner

*Primary Examiner* — Loha Ben
(74) *Attorney, Agent, or Firm* — Thomas, Kayden, Horstemeyer & Risley, LLP

(57) ABSTRACT

An electrophoretic display device includes a substrate, an electrophoretic component layer, a first optical adhesive, a barrier layer, a second optical adhesive, a protective layer, and a sealant. The first optical adhesive and the second optical adhesive contribute in helping to provide light exposure to the sealant. One of the first optical adhesive and the second optical adhesive is capable of absorbing the light of predetermined wavelength and is adapted to expose the sealant.

26 Claims, 12 Drawing Sheets

ELECTROPHORETIC DISPLAY

BACKGROUND

1. Technical Field

The disclosure relates generally to an electrophoretic display device. Particularly, the present invention relates to a completely sealed enclosure of the electrophoretic display device.

2. Related Art

Conventional electrophoretic display devices utilize TiO2 or other elements as one of the materials for electrophoretic display particles. However, since TiO2 and some of the other materials have ultra-violet (UV) light absorbing properties, if ultra-violet light protection for the electrophoretic display particles is not provided, the electrophoretic display devices cannot operate normally due to ultra-violet light exposure in the nature environment.

Consequently, in order to ensure the proper functioning, conventional electrophoretic display devices typically have an anti-UV layer disposed thereon to prevent the electrophoretic display particles from exposure to UV light. During the installation of the anti-UV layer on the electrophoretic display device, a UV curing sealant is typically utilized. The electrophoretic display device is exposed to UV light to cure the sealant. However, with the anti-UV layer installed, the anti-UV layer may affect the curing of the sealant during the curing process, resulting in incomplete curing of the sealant. The incomplete curing of the sealant leads to the inability of the sealant to completely seal the device, and thus results in decreased device lifespan as well as increased defective rates for the device. In view of the mentioned problems, the present invention seeks to overcome these obstacles by providing an acceptable and effective solution.

SUMMARY

It is an object of the present invention to provide an electrophoretic display device with an optical adhesive having anti-UV property to accomplish the goal of ensuring a complete sealant curing process.

It is another object of the present invention to provide electrophoretic display device with an adhesive having anti-UV property arranged to accomplish the goal of completely exposing the sealant.

The electrophoretic display device of the present invention includes a substrate, an electrophoretic display component layer, a barrier layer, a protective layer, and a sealant. The electrophoretic display component layer has a top surface and a bottom surface. The top surface has a first width, and adheres to the first optical adhesive. The bottom surface is disposed on the substrate. The barrier layer has a top barrier surface and a bottom barrier surface. The bottom barrier surface adheres to the first optical adhesive while the top barrier surface adheres onto the second optical adhesive. The sealant seals the sides of the electrophoretic display component layer, the barrier layer, and the protective layer to the substrate, wherein the sealant cures upon exposure to light predetermined wavelength. In general, at least one of the first optical adhesive and the second optical adhesive is capable of absorbing the light of predetermined wavelength. The sealant is exposed under the light of predetermined wavelength.

DETAILED DESCRIPTION OF THE PREFERRED EMBODIMENT

Figure 1A:
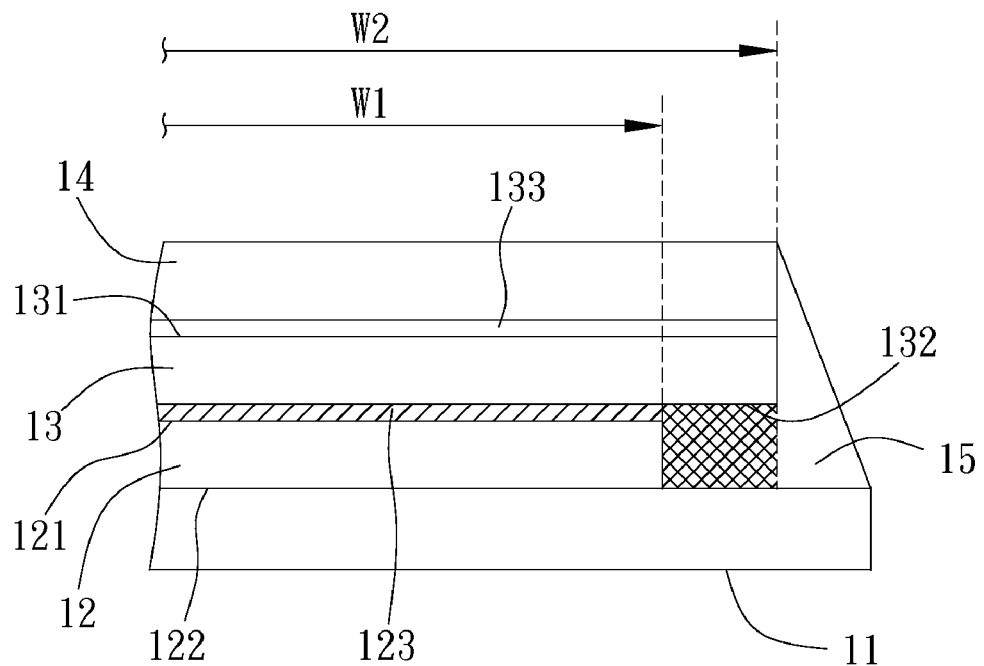
FIG. 1A is a cross-sectional view of the electrophoretic display device of the present invention.
Figure 1B:
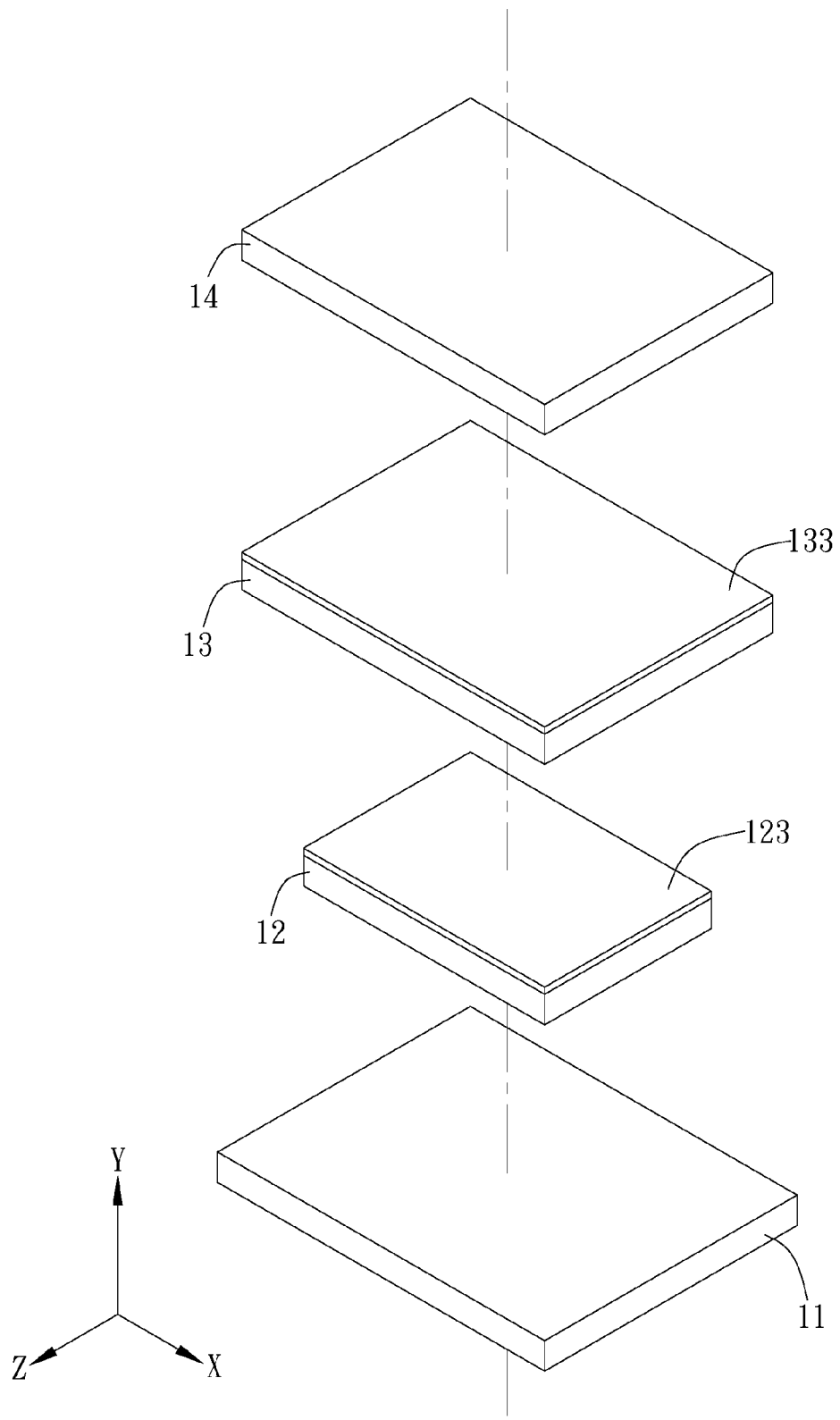
FIG. 1B is an exploded view of the electrophoretic display device of the present invention.

Shown in the embodiment in FIG. 1, the electrophoretic display device 1 includes a substrate 11, an electrophoretic display component layer 12, a barrier layer 13, a protective layer 14, and a sealant 15. The substrate 11 is preferably a pliable material such as glass, a plastic substrate or a thin metal plate. In terms of materials to use for plastic substrates, Polyethylene Terephthalate (PET), Polyethylene naphthalate (PEN), Polyethersulfone (PES), Arton films, and transparent resins of Cyclic Olefin Copolymer (COC) are the preferred materials. The electrophoretic display component layer 12 has a top surface 121 and a bottom surface 122. A first optical adhesive 123 is attached onto the top surface 121, wherein the top surface 121 has a first width W1 The mentioned first width W1 refers to the distance that the electrophoretic display component layer 12 is distributed along the x-axis as seen in FIG. 1A, and not to the thickness of the electrophoretic display component layer 12. In the present embodiment, the distance of the first optical adhesive 123 along the x-axis is preferably identical to the width W1. The reasoning behind the identical distances is that after the first optical adhesive 123 is adhered onto the electrophoretic display component layer 12, both the first optical adhesive 123 and the electrophoretic display component layer 12 may then be cut simultaneously, resulting in the same distances. However, in other embodiments (not shown), the distance of the first optical adhesive 123 along the x-axis may be different from the distance of the electrophoretic display component layer 12.

As shown in FIG. 1A, the bottom surface 122 of the electrophoretic display component layer 12 is disposed on the substrate 11 and provides the electrophoretic display component layer 12 with a stable structure. In the present embodiment, the display component of the electrophoretic display component layer 12 preferably forms a microcup structure, as shown in FIG. 1D. However, in other embodiments, the display component of the electrophoretic display component layer 12 may also form microcapsule structures instead.

As shown in FIG. 1A, the barrier layer 13 has a top barrier surface 131 and a bottom barrier surface 132. In the present embodiment, the second optical adhesive 133 is attached onto the top barrier surface 131 while the first optical adhesive 123 is attached onto the bottom barrier surface 132. In short, the barrier layer 13 is attached to the electrophoretic display component layer 12 by way of the first optical adhesive 123. The barrier layer 13 is a waterproof layer while the protective layer 14 is typically an anti-glare film layer or any other layers with optical function. The distance distributed by the second optical adhesive 133 along the x-axis is preferably identical to the width of the barrier layer 13. The mentioned width of the barrier layer 13 refers to the distance of the barrier layer 13 distributed along the x-axis, and not to the thickness of the barrier layer 13.

As shown in FIG. 1A, the protective layer 14 (in the present embodiment, cannot absorb UV light) has a second width W2 and adheres to the second optical adhesive 133. The mentioned second width W2 refers to the distance that the protective layer 14 is distributed along the x-axis and not to the thickness of the protective layer 14. The width of the barrier layer 13 is identical to the second width W2. The protective layer 14 is disposed on the barrier layer 13 by way of the second optical adhesive 133. In general, the second width W2 is greater than the first width W1 to allow the protective layer 14 to protect the individual optical component layers beneath the barrier layer 13. As shown in the embodiment in FIG. 1B, protective layer 14, with its larger surface area, overlaps electrophoretic display component layer 12, Under closer inspection, the covering surface area of the barrier layer 13 in the present embodiment is identical in dimension to the surface area of the protective layer 14.

In addition, as shown in FIG. 1A, the sealant 15 seals the sides of the electrophoretic display component 12, the barrier layer 13, and the protective layer 14 onto the substrate 11. In other words, the sealant 15 directly fixes the electrophoretic display component layer 12, the barrier layer 13, and the protective layer 14 to the substrate 11. In the present embodiment, the sealant 15 cures upon exposure to light of predetermined wavelength. The predetermined wavelength is preferably the wavelength of UV light. Therefore, the sealant 15 preferably includes UV sealants (otherwise known as ultra-violet light curing sealants). UV sealants directly exposed to UV light harden under polymerization. In the present embodiment, when the sealant 15 is sealing the sides, a portion of the sealant 15 (indicated by the crisscross area) is covered by the protective layer 14 and the barrier layer 13, but not covered by the electrophoretic display component layer 12. Since the protective layer 14 and the second optical adhesive 133 in the present embodiment do not absorb the UV light, the sealant cures under complete exposure to the UV light.

Figure 1C:
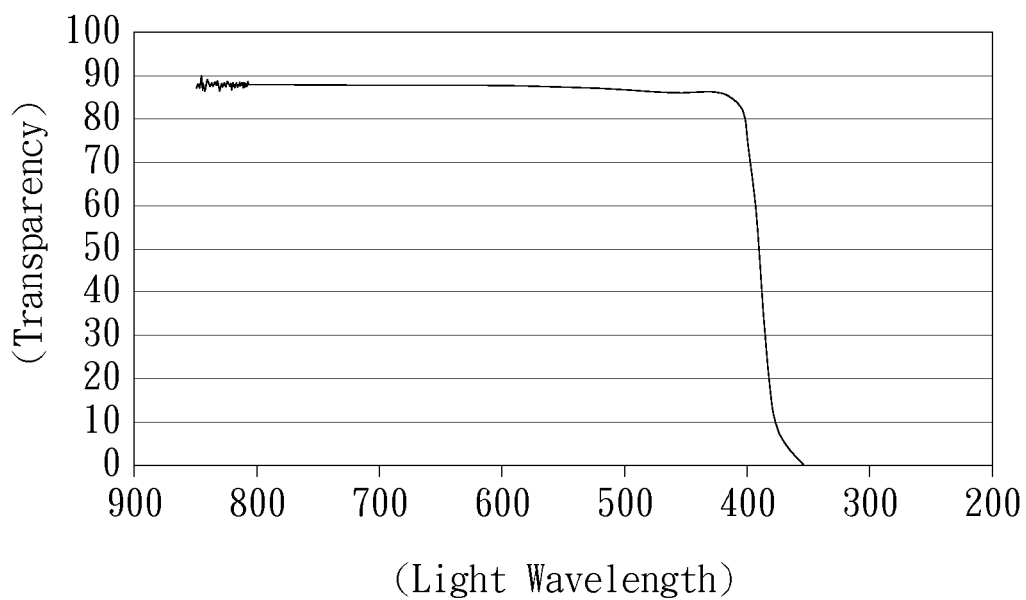
FIG. 1C is a graph illustrating the wavelength range of absorption of the optical adhesive of the present invention.
Figure 1D:
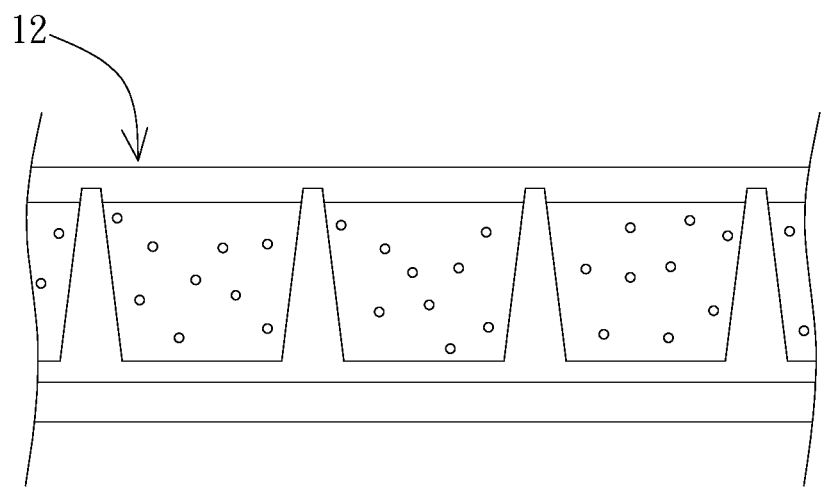
FIG. 1D is cross-sectional view of the structure of the display component of the electrophoretic display component layer in accordance with one embodiment of the present invention.

Shown in FIGS. 1A and 1C, the first optical adhesive 123 that is disposed between the electrophoretic display component layer 12 and the barrier layer 13 as well as the second optical adhesive 133 that is disposed between the barrier layer 13 and the protective layer 14 can both achieve a transmittance substantially of 90% for light of wavelengths over 400 nm. In order to protect the electrophoretic display component layer 12 from effects of the UV light and completely expose the sealant 15 to the UV light, at least one of the first optical adhesive 123 and the second optical adhesive 133 can be designed with different structures and absorb light of predetermined wavelength (e.g. UV light). In this embodiment, since the UV light usually shines downward along the y-axis, if the first optical adhesive 123 is designed to be an optical adhesive (marked with slanted lines) capable of absorbing light of predetermined wavelength, then such an optical adhesive as shown in FIG. 1C can absorb UV light of wavelengths lower than 400 nm and protect the electrophoretic display component layer 12 sufficiently. In the present embodiment, the optical adhesive (marked with slanted lines capable of absorbing light of predetermined wavelength (e.g. UV light) contains Ultra-violet absorbers such as $C_{17}H_{18}N_3OCL$.

Figure 2A:
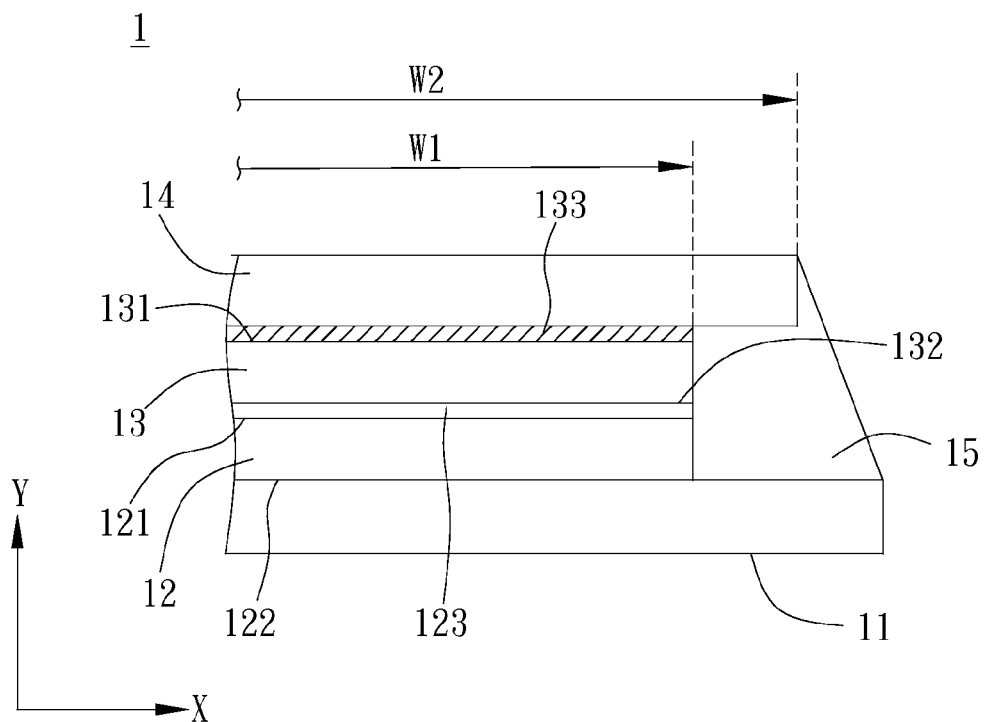
FIG. 2A is a cross-sectional view of an embodiment of the electrophoretic display device.
Figure 2B:
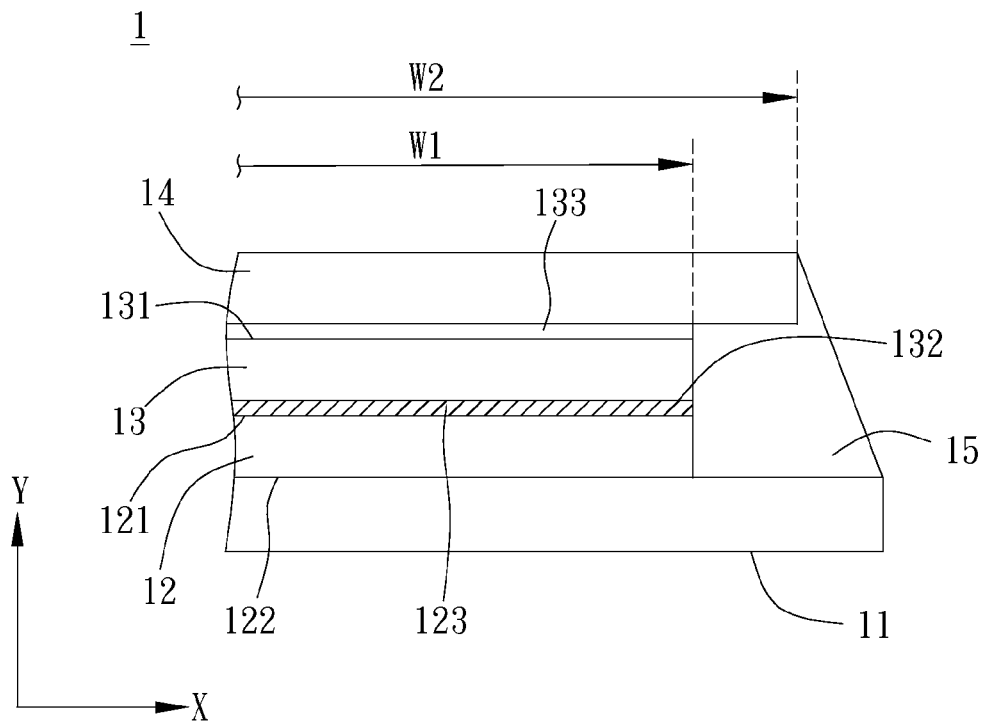
FIG. 2B is a cross-sectional view of an embodiment of the electrophoretic display device.

As the embodiment in FIG. 2A illustrates, the covering surface area of the barrier layer 13 is identical to the surface area of the electrophoretic display component layer 12. Likewise, it can be seen from the cross-sectional side view of the electrophoretic display device 1 that the widths of the electrophoretic display component layer 12 the barrier layer 13, the first optical adhesive 123, and the second optical adhesive 133 are also identical in length. The width mentioned herein refers to the distance the component layers are distributed along the x-axis as shown in FIG. 2A, and not to the thickness of the component layers. As shown the embodiment in FIGS. 2A and 2B, in order to protect the electrophoretic display component layer 12 from effects of the UV light and completely expose the sealant 15 to UV light, the first optical adhesive 123 or the second optical adhesive 133 may be designed to be an optical adhesive (marked with slanted lines) capable of absorbing light of predetermined wavelength (e.g. UV light). Alternatively both the first optical adhesive 123 and the second optical adhesive 133 may also be designed to absorb light of predetermined wavelength (e.g. UV light). In the present embodiment, the optical adhesive (marked with slanted lines) capable of absorbing light of predetermined wavelength (e.g. UV light) contains Ultra-violet absorbers such as $C_{17}H_{18}N_3OCL$.

Figure 3:
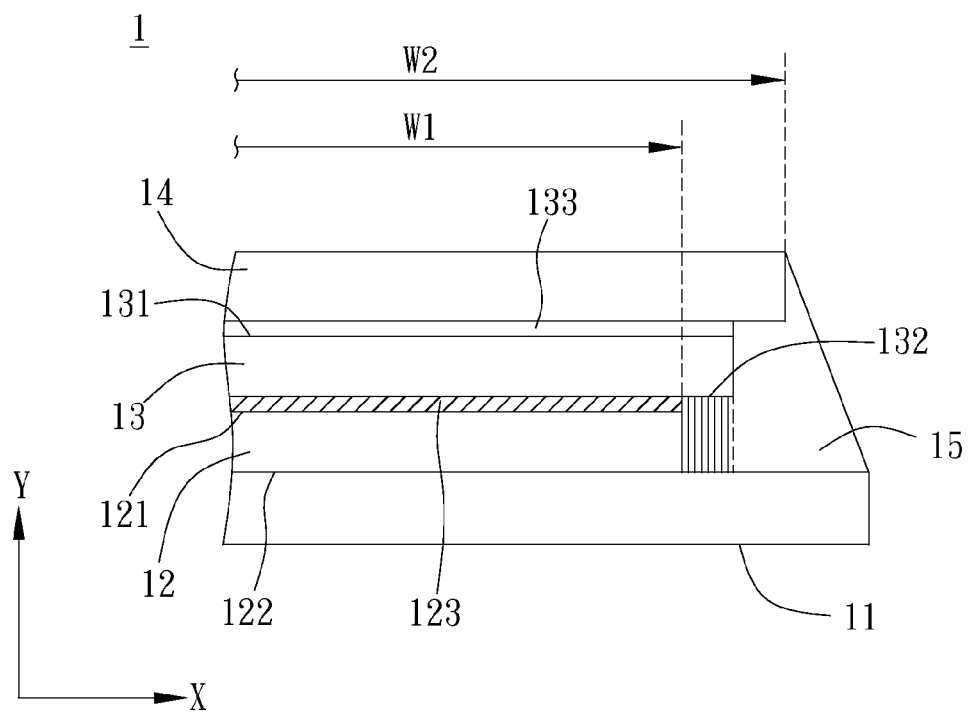
FIG. 3 is a cross-sectional view of an embodiment of the electrophoretic display device.

As shown in the embodiment in FIG. 3, the covering surface area of the barrier layer 13 is greater than the surface area of the electrophoretic display component layer 12. It can be seen from the cross-sectional side view of the electrophoretic display device 1 that the width of the barrier layer 13 is greater than the first width W1 (also the width of the electrophoretic display component layer 12). The width mentioned herein refers to the distance the component layers are distributed along the x-axis, and not to the thickness of the component layers. As seen in the embodiment in FIG. 3, the width of the second optical adhesive 133 is generally greater than the width of the first optical adhesive 123. If the second optical adhesive 133 is designed to absorb light of predetermined wavelength (e.g. UV light), a portion of the sealant (indicated with vertical lines) is not exposed to the light of predetermined wavelength. Therefore, in the present embodiment, the first optical adhesive 123 is designed to be an optical adhesive (marked with slanted lines) capable of absorbing light of predetermined wavelength (e.g. UV light). In the present embodiment, the optical adhesive capable of absorbing light of predetermined wavelength contains Ultra-violet absorbers such as $C_{17}H_{18}N_3OCL$.

Figure 4:
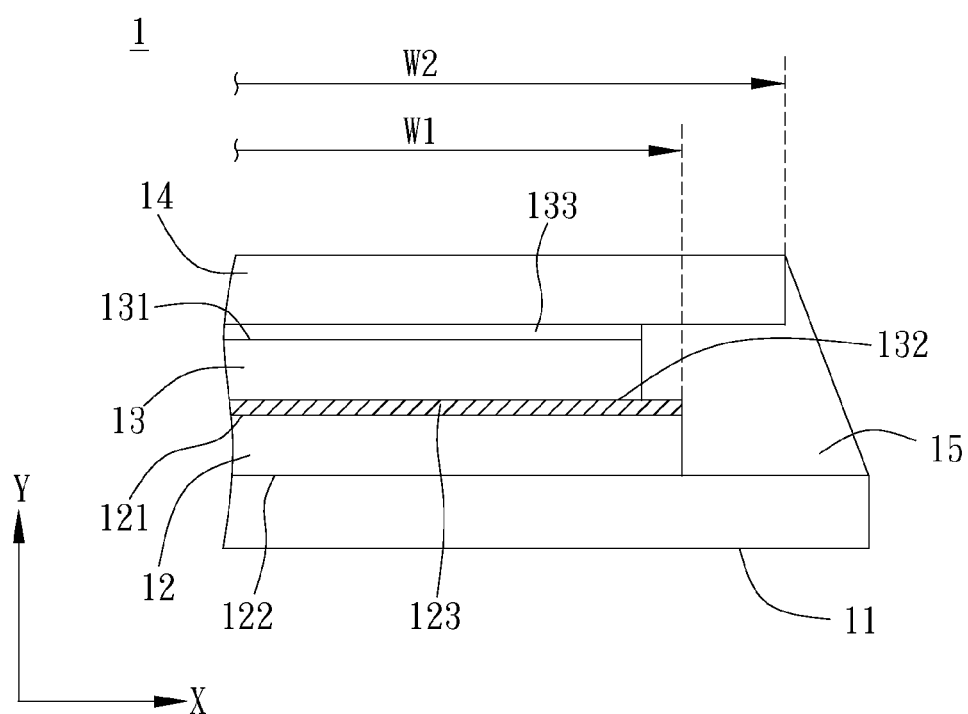
FIG. 4 is a cross-sectional view of an embodiment of the electrophoretic display device.

As shown in the embodiment in FIG. 4, when the covering surface area of the barrier layer 13 is less than or equal to the surface area of the electrophoretic display component layer 12, it can be seen from the cross-sectional side view of the electrophoretic display device 1 that the width of the electrophoretic display component layer 12 or the width of the first optical adhesive 123 is greater than the width of the second optical adhesive 133 or the width of the barrier layer 13. The width mentioned herein refers to the distance the component layers are distributed along the x-axis, and not to the thickness of the component layers. In order to sufficiently protect the electrophoretic display component layer 12 from the effects of exposure to UV light and completely expose the sealant 15 to the UV light, the first optical adhesive 123 may be designed to absorb light of predetermined wavelength (UV light) to protect the electrophoretic display component layer 12 from exposure to UV light. In this manner, the first optical adhesive 123 can prevent any adverse reactions by the electrophoretic display component layer 12 to exposure of UV light. In the present embodiment, the optical adhesive capable of absorbing light of predetermined wavelength contains Ultra-violet absorbers such as $C_{17}H_{18}N_3OCL$.

Figure 5A:
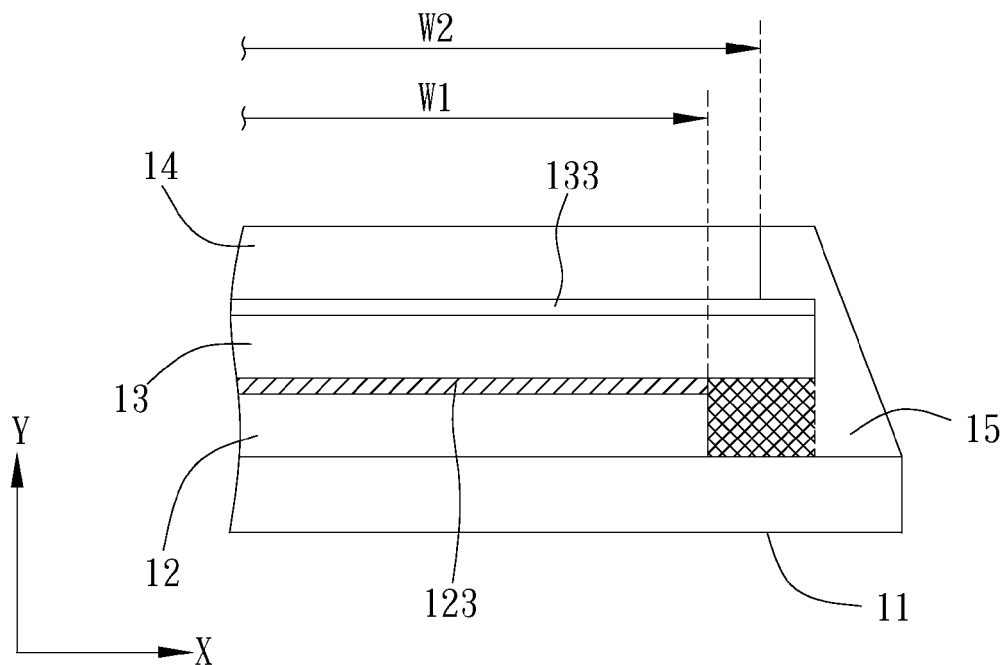
FIG. 5A is a cross-sectional view of an embodiment of the electrophoretic display device.
Figure 5B:
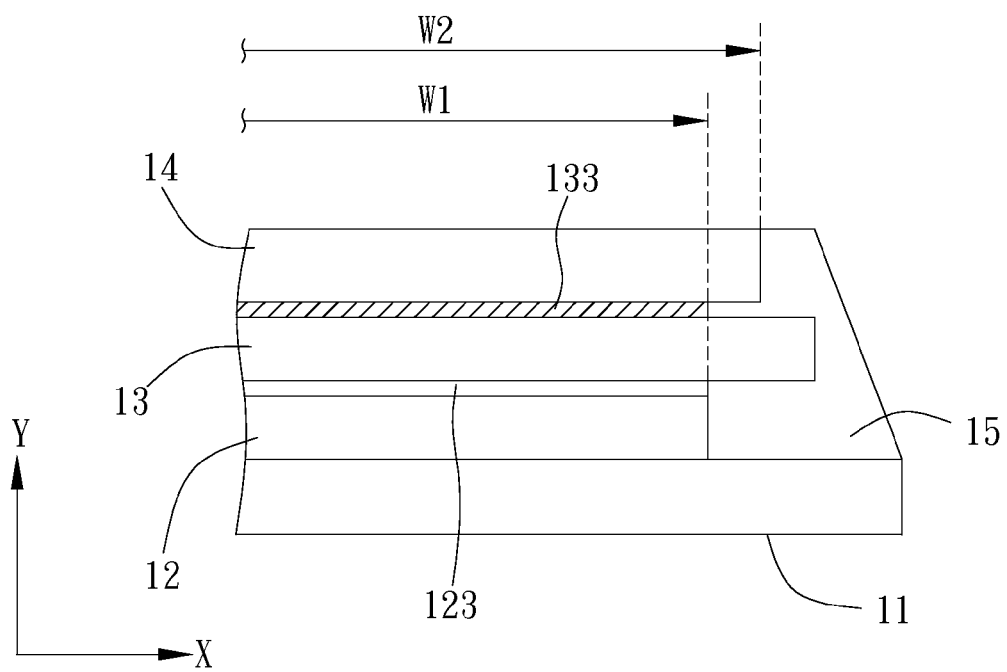
FIG. 5B is a cross-sectional view of an embodiment of the electrophoretic display device.

However, as shown in the embodiment in FIGS. 5A and 5B, the width of the barrier layer 13 may be greater than the second width W2 or the first width W1. The width mentioned herein refers to the distance the component layers are distributed along the x-axis, and not to the thickness of the component layers. As shown in the embodiment in FIG. 5A, if the second optical adhesive 133 is designed to absorb light of predetermined wavelength (e.g. UV light), a portion of the sealant 15 (indicated with crisscross lines) is not completely exposed to light of predetermined wavelength (e.g. UV light). Therefore, the first optical adhesive 123 should be designed to absorb light of predetermined wavelength (e.g. UV light) to provide protection for the electrophoretic display component layer 12 from the subsequent negative effects of exposure to UV light. However, as shown in FIG. 5B, when the width of the second optical adhesive 133 is identical to the width of the first optical adhesive 123, in order to protect the electrophoretic display component layer 12 from effects of the UV light and completely expose the sealant 15 to UV light, the first optical adhesive 123 or the second optical adhesive 133 may be designed to absorb light of predetermined wavelength (e.g. UV light). Alternatively, the first optical adhesive 123 and the second optical adhesive 133 may also both be able to absorb light of predetermined wavelength (e.g. UV light). In the present embodiment, the optical adhesive capable of absorbing light of predetermined wavelength contains Ultra-violet absorbers such as $C_{17}H_{18}N_3OCL$.

Figure 6A:
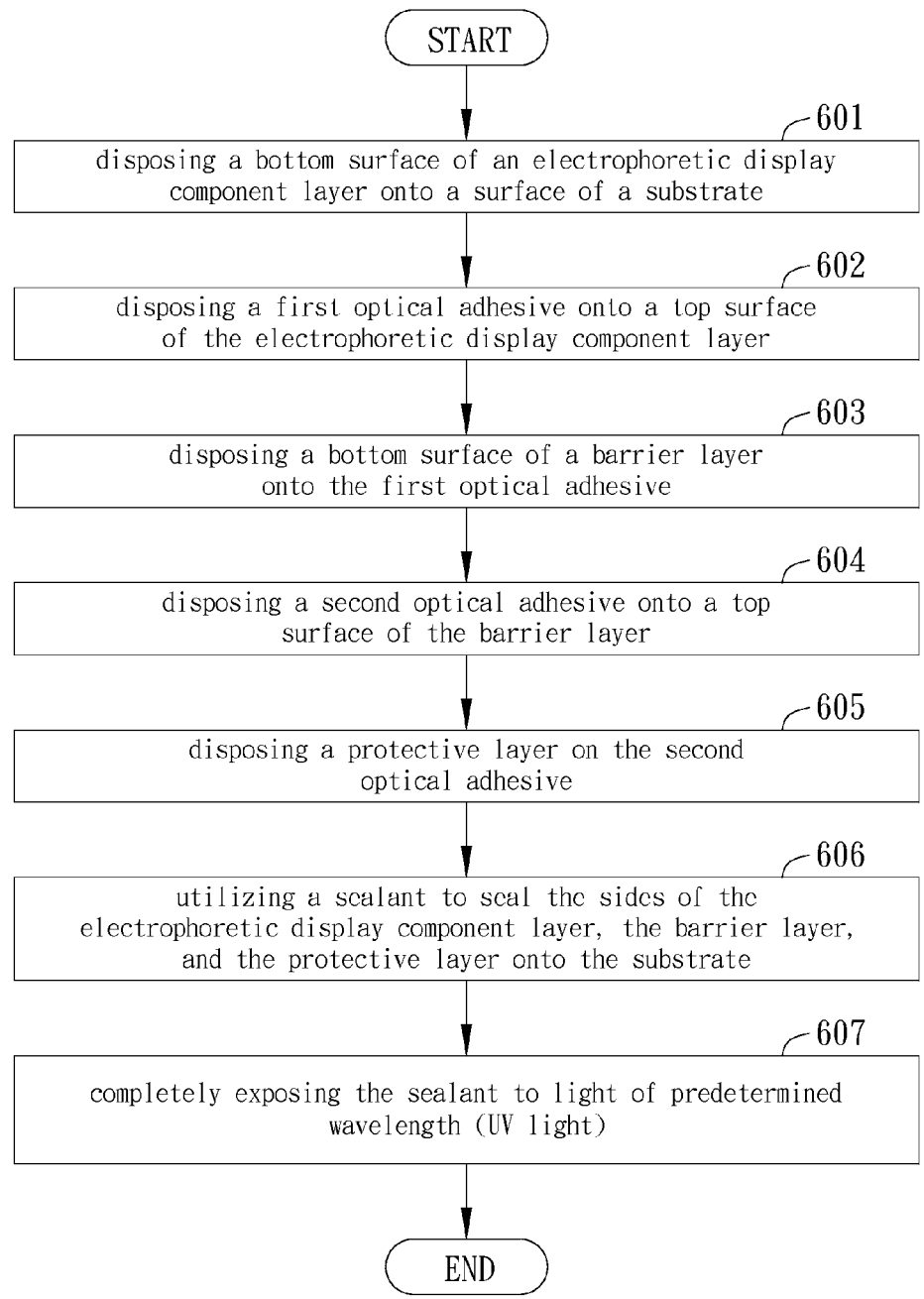
FIG. 6A is a flow diagram of the manufacturing method of the electrophoretic display device.

As shown in the flow chart in FIG. 6A, the manufacturing method of the electrophoretic display device includes the following in steps 601, 602, 603, 604, 605, 606, and 607. Step 601 involves disposing a bottom surface of an electrophoretic display component layer onto a surface of a substrate. The top surface of the electrophoretic display component layer has a first width W1. The width mentioned herein refers to the distance the electrophoretic display component layer is distributed along the x-axis, and not to the thickness of the electrophoretic component layer. Step 602 involves disposing a first optical adhesive onto a top surface of the electrophoretic display component layer. Step 603 involves disposing a bottom surface of a barrier layer onto the first optical adhesive. Step 604 involves disposing a second optical adhesive onto a top surface of the barrier layer. Step 605 involves disposing a protective layer on the second optical adhesive. The protective layer has a second width W2, wherein the second width W2 is greater than the first width W1. The second width W2 mentioned herein refers to the distance the protective layer is distributed along the x-axis, and not to the thickness of the protective layer. Step 606 involves utilizing a sealant to seal the sides of the electrophoretic display component layer, the barrier layer, and the protective layer onto the substrate. The sealant cures upon exposure to light of predetermined wavelength. At least one of the first optical adhesive and the second optical adhesive can absorb light of predetermined wavelength. Step 607 involves completely exposing the sealant to light of predetermined wavelength (UV light). In the present step, at least one of the first optical adhesive and the second optical adhesive is adapted to completely expose the sealant to light of predetermined wavelength (UV). In the above mentioned steps, step 601 of disposing the electrophoretic display component does not necessarily always precede step 602. In other embodiments, step 601 may in fact succeed step 602.

Figure 6B:
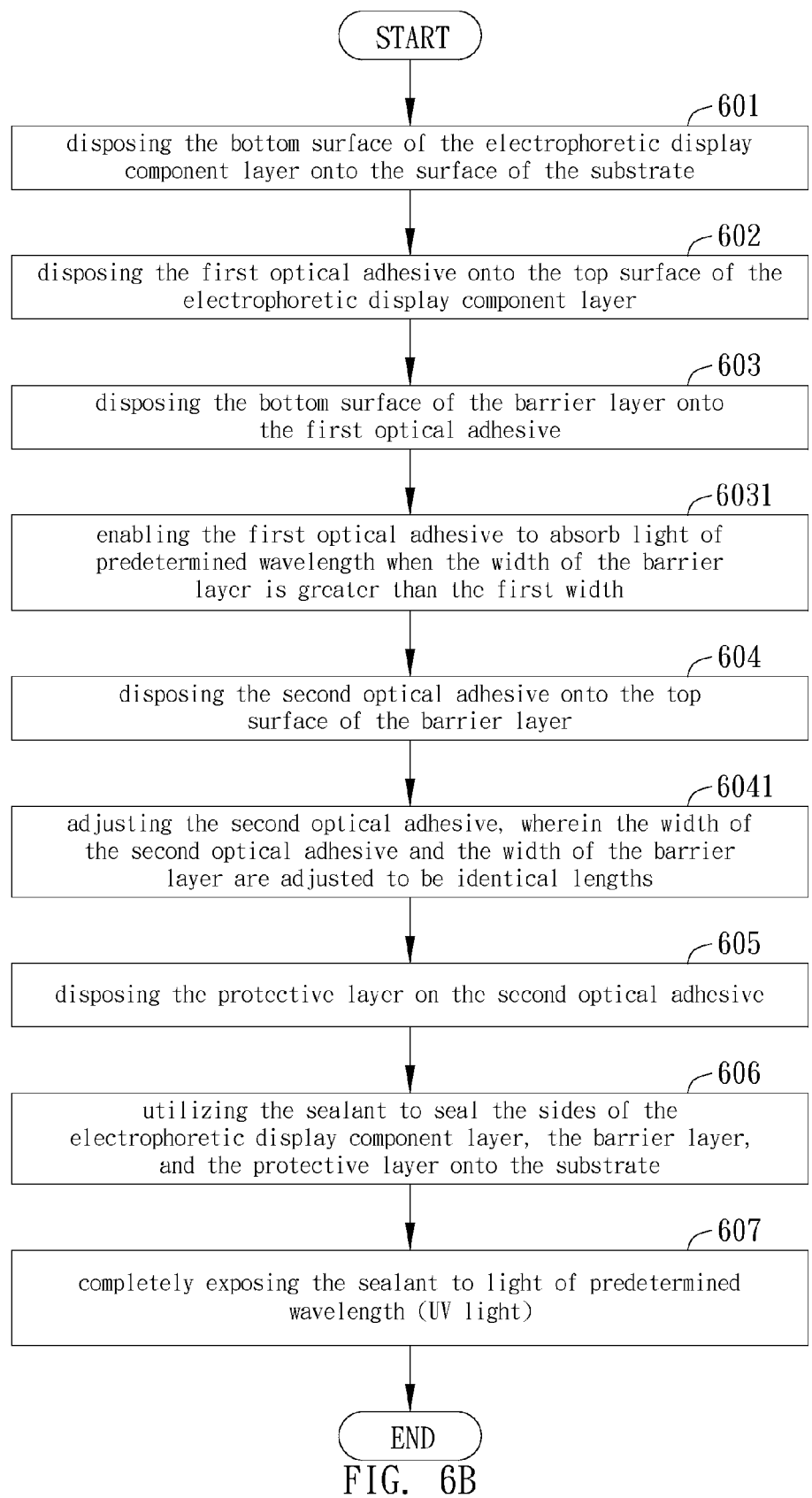
FIG. 6B is a flow diagram of the manufacturing method of the electrophoretic display device.

As shown in the flowchart of the manufacturing method of the electrophoretic display device in FIG. 6B, step 603 of disposing the bottom surface of the barrier layer further includes step 6031 where the first optical adhesive can absorb light of predetermined wavelength when the width of the barrier layer is greater than the first width W1. In addition, the manufacturing method of the electrophoretic display device may, according to design requirements, also further include step 6041 in between steps 604 and 605. Step 6041 includes adjusting the second optical adhesive, wherein the width of the second optical adhesive and the width of the barrier layer are adjusted to be identical lengths. However, step 6041 is not necessarily required in the manufacturing method if the design requirements do not specify it leaving it out would also suffice. The width mentioned herein refers to the distance the component layers are distributed along the x-axis, and not to the thickness of the individual component layers.

Figure 6C:
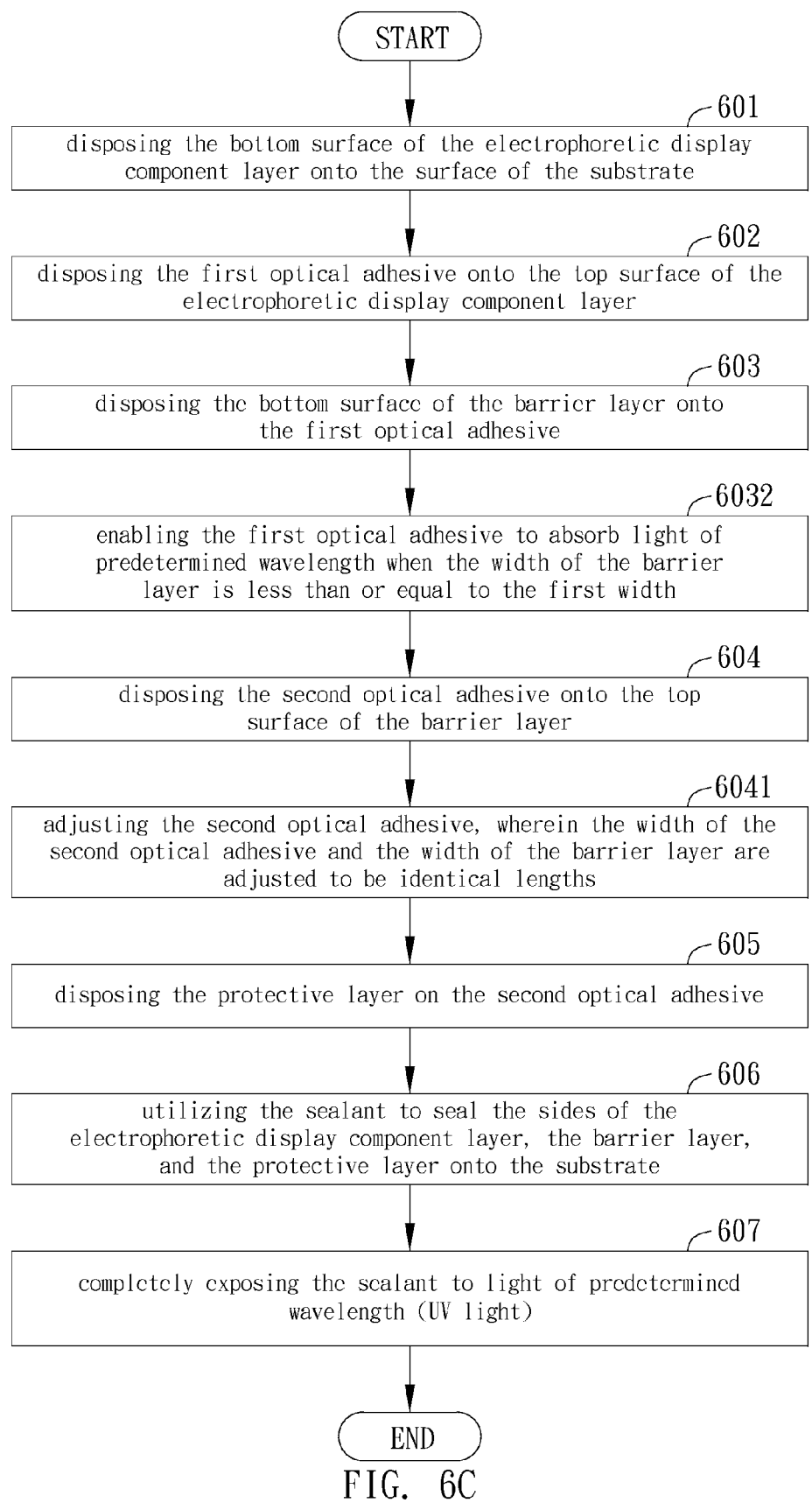
FIG. 6C is a flow diagram of the manufacturing method of the electrophoretic display device.

As shown in the flowchart of the manufacturing method of the electrophoretic display device in FIG. 6C, step 603 of disposing the bottom surface of the barrier layer further includes step 6032, wherein the first optical adhesive can absorb light of predetermined wavelength when the width of the barrier layer is less than or equal to the first width W1. In addition, the manufacturing method of the electrophoretic display device may, according to design requirements, also further include step 6041 in between steps 604 and 605. Step 6041 includes adjusting the second optical adhesive, wherein the width of the second optical adhesive and the width of the barrier layer are adjusted to be identical lengths. However, step 6041 is not necessarily required in the manufacturing method if the design requirements do not specify it as leaving it out would also suffice. The width mentioned herein refers to the distance the component layers are distributed along the x-axis, and not to the thickness of the individual component layers.

Figure 6D:
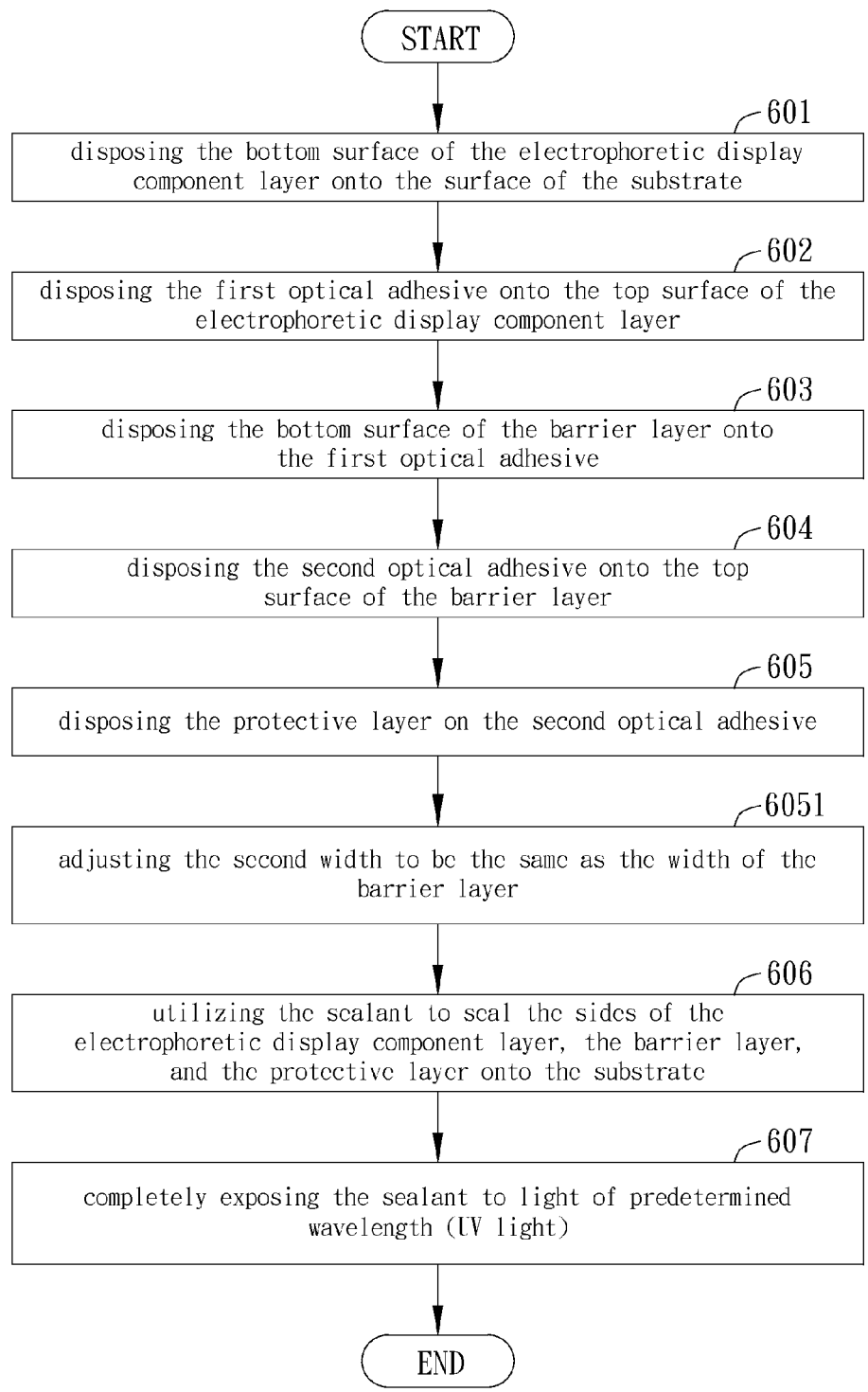
FIG. 6D is a flow diagram of the manufacturing method of the electrophoretic display device.

As shown in the flowchart of the manufacturing method of the electrophoretic display device in FIG. 6D, step 605 of disposing the protective layer further includes step 6051, wherein the second width is adjusted the same as the width of the barrier layer and the first optical adhesive can absorb light of predetermined wavelength. In addition, the manufacturing method of the electrophoretic display device may, according to design requirements, also further include step 6041 in between steps 604 and 605. Step 6041 includes adjusting the second optical adhesive, wherein the width of the second optical adhesive and the width of the barrier layer are adjusted to be identical lengths. However, step 6041 is not necessarily required in the manufacturing method if the design requirements do not specify it as leaving it out would also suffice. The width mentioned herein refers to the distance the component layers are distributed along the x-axis, and not to the thickness of the individual component layers.

Figure 7:
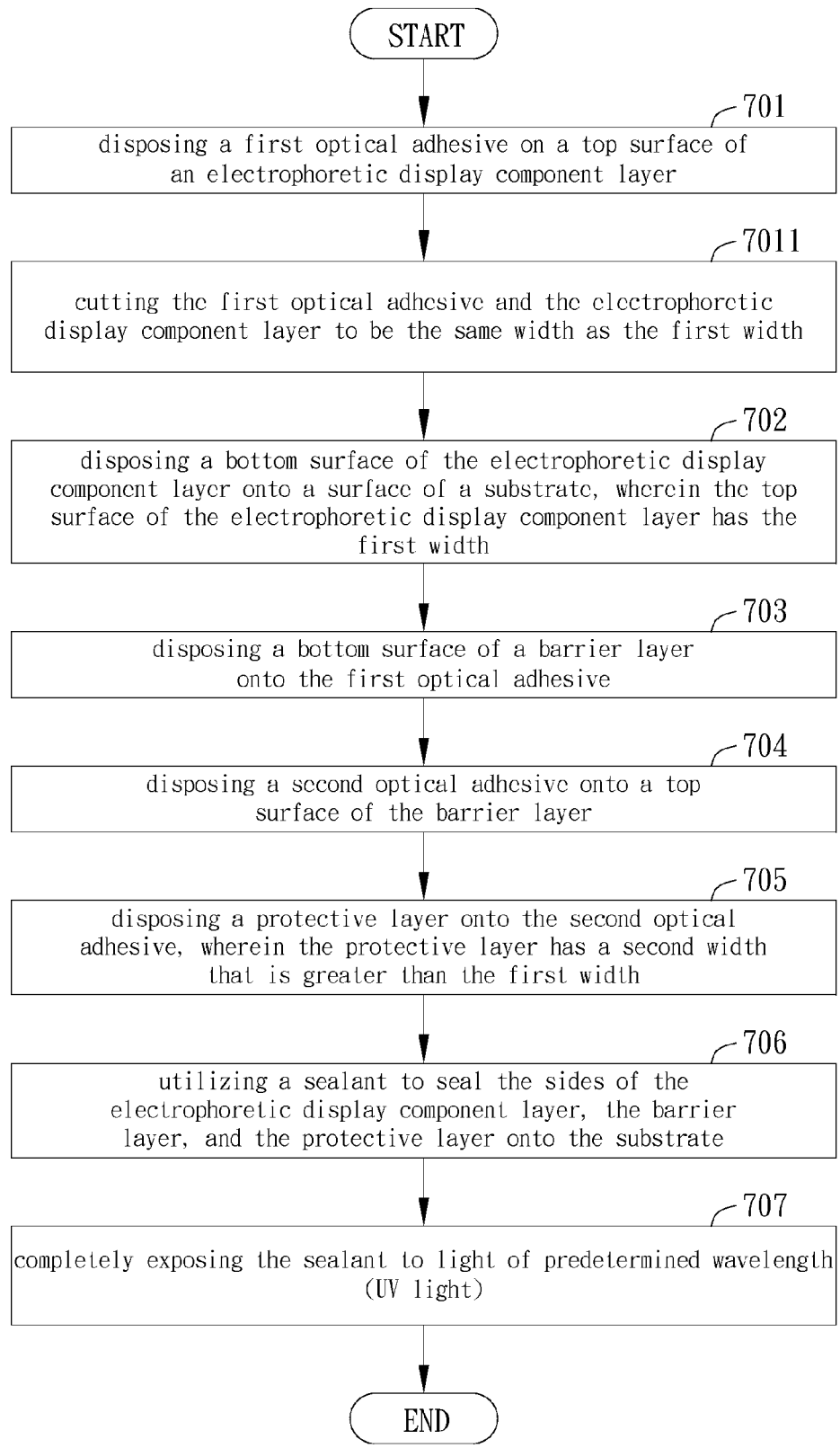
FIG. 7 is a flow diagram of the manufacturing method of the electrophoretic display device.

As shown in the flowchart in FIG. 7, the manufacturing method of the electrophoretic display device includes the following steps. Step 701 involves disposing a first optical adhesive on a top surface of an electrophoretic display component layer. Step 701 further includes step 7011, wherein the first optical adhesive and the electrophoretic display component layer are cut to have the same width as the first width W1.

In the present step, roll-to-roll technology may be adopted to quickly mass produce electrophoretic display devices. Step 702 involves disposing a bottom surface of the electrophoretic display component layer onto a surface of a substrate, wherein the top surface of the electrophoretic display component layer has the first width W1. The first width W1 mentioned herein refers to the distance the electrophoretic display component layer is distributed along the x-axis, and not to the thickness of the electrophoretic display component layer. Step 703 involves disposing a bottom surface of a barrier layer onto the first optical adhesive. Step 704 involves disposing a second optical adhesive onto a top surface of the barrier layer. Step 705 involves disposing a protective layer onto the second optical adhesive, wherein the protective layer has a second width W2 that is greater than the first width W1. Step 706 involves utilizing a sealant to seal the sides of the electrophoretic display component layer, the barrier layer, and the protective layer onto the substrate. The sealant cures upon exposure to light of predetermined wavelength. At least one of the first optical adhesive and the second optical adhesive can absorb light of predetermined wavelength (UV light). Step 707 involves completely exposing the sealant to light of predetermined wavelength (UV light).

Figure 8:
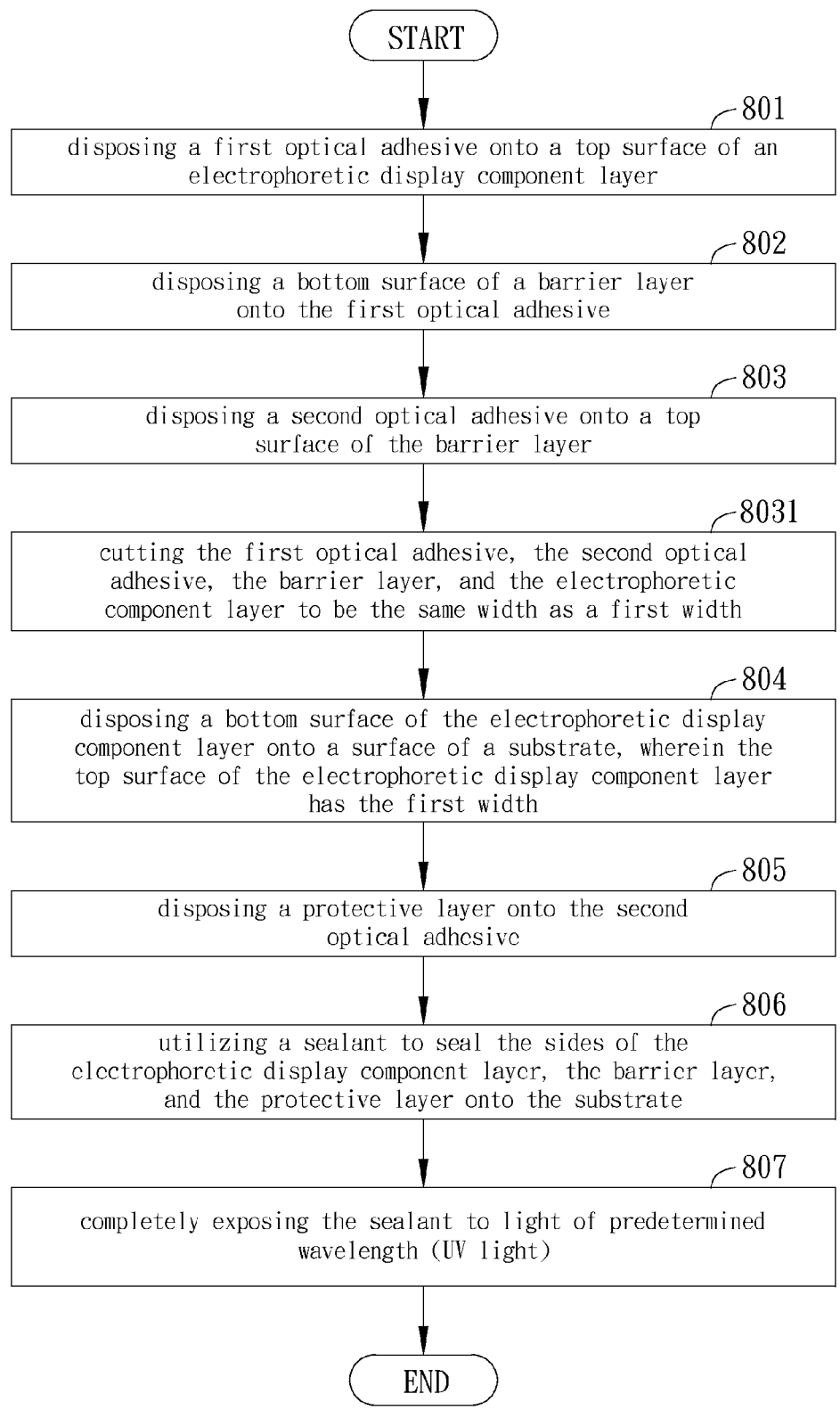
FIG. 8 is a flow diagram of the manufacturing method of the electrophoretic display device.

As shown in the flowchart in FIG. 8, the manufacturing method of the electrophoretic display device includes the following steps. Step 801 involves disposing a first optical adhesive onto a top surface of an electrophoretic display component layer. In the present step, roll-to-roll technology may be adopted to quickly mass produce electrophoretic display devices. Step 802 involves disposing a bottom surface of a barrier layer onto the first optical adhesive. Step 803 involves disposing a second optical adhesive onto a top surface of the barrier layer. Step 803 further includes step 8031, wherein the first optical adhesive, the second optical adhesive, the barrier layer, and the electrophoretic component layer are cut to have the same width as a first width W1. The width mentioned herein refers to the distance the individual component layers are distributed along the x-axis, and not to the thickness of the individual component layers. The second optical adhesive can absorb light of predetermined wavelength (UV light). Step 804 involves disposing a bottom surface of the electrophoretic display component layer onto a surface of a substrate, wherein the top surface of the electrophoretic display component layer has the first width W1. The first width W1 mentioned herein refers to the distance the electrophoretic display component layer is distributed along the x axis, and not to the thickness of the electrophoretic display component layer. Step 805 involves disposing a protective layer onto the second optical adhesive. The protective layer has a second width W2 that is greater than the first width W1. The second width W2 mentioned herein refers to the distance the protective layer is distributed along the x-axis, and not to the thickness of the protective layer. Step 806 involves utilizing a sealant to seal the sides of the electrophoretic display component layer, the barrier layer, and the protective layer onto the substrate. The sealant cures upon exposure to light of predetermined wavelength. At least one of the first optical adhesive and the second optical adhesive can absorb light of predetermined wavelength (UV light). Step 807 involves completely exposing the sealant to light of predetermined wavelength (UV light). In the present step, at least one of the first optical adhesive and the second optical adhesive is adapted to completely expose the sealant to light of predetermined wavelength (UV). In addition, the order of the above mentioned steps of the different embodiments does not necessarily have to follow the suggested order recommended herein. In practice, the order may be changed to adapt to user demands.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An electrophoretic display device, comprising:
 a substrate;
 an electrophoretic display component layer, having a top surface and a bottom surface, the top surface having a first width and a first optical adhesive adhered thereon, the bottom surface being disposed on the substrate;
 a barrier layer, having a top barrier surface and a bottom barrier surface, the bottom barrier surface attached to the first optical adhesive, the top barrier surface attached to a second optical adhesive;
 a protective layer, having a second width and being attached to the second optical adhesive, wherein the second width is greater than the first width; and
 a sealant for sealing the sides of the electrophoretic display component layer, the barrier layer, and the protective layer onto the substrate, wherein the sealant cures upon exposure to light of predetermined wavelength;
 wherein at least one of the first optical adhesive and the second optical adhesive is capable of absorbing the light of predetermined wavelength and is adapted to expose the sealant.

2. The electrophoretic display device of claim 1, wherein the width of the barrier layer is the same as the first width.

3. The electrophoretic display device of claim 2, wherein the second optical adhesive is capable of absorbing the light of predetermined wavelength.

4. The electrophoretic display device of claim 1, wherein the width of the barrier layer is greater than the first width and the first optical adhesive is capable of absorbing the light of predetermined wavelength.

5. The electrophoretic display device of claim 1, wherein the width of the barrier layer is the same as the second width and the first optical adhesive is capable of absorbing the light of predetermined wavelength.

6. The electrophoretic display device of claim 1, wherein the width of the barrier layer is less than or equal to the first width and the first optical adhesive is capable of absorbing the light of predetermined wavelength.

7. The electrophoretic display device of claim 1, wherein the first optical adhesive or the second optical adhesive that is capable of absorbing the light of predetermined wavelength contains an ultra-violet absorber comprising $C_{17}H_{18}N_3OCL$.

8. The electrophoretic display device of claim 1, wherein the width of the first optical adhesive is the same as the first width.

9. The electrophoretic display device of claim 1, wherein the width of the second optical adhesive is the same as the width of the barrier layer.

10. An electrophoretic display device, comprising:
 a substrate;
 an electrophoretic display component layer, having a top surface and a bottom surface, the top surface attached to a first optical adhesive, the bottom surface attached to the substrate;

a barrier layer, having a top barrier surface and a bottom barrier surface, the bottom barrier surface attached to the first optical adhesive, the top barrier surface attached to a second optical adhesive;

a protective layer, adhering to the second optical adhesive, the surface area of the protective layer being greater than and overlapping the surface area of the electrophoretic display component layer; and a sealant for sealing the sides of the electrophoretic display component layer, the barrier layer, and the protective layer onto the substrate, the sealant cures upon exposure to light of predetermined wavelength;

wherein at least one of the first optical adhesive and the second optical adhesive is capable of absorbing the light of predetermined wavelength and is adapted to expose the sealant.

11. The electrophoretic display device of claim 10, wherein the surface area covered by the barrier layer is the same as the surface area of the electrophoretic display component layer.

12. The electrophoretic display device of claim 11, wherein the second optical adhesive is capable of absorbing the light of predetermined wavelength.

13. The electrophoretic display device of claim 10, wherein the surface area covered by the barrier layer is greater than the surface area of the electrophoretic display component layer, and the first optical adhesive is capable of absorbing the light of predetermined wavelength.

14. The electrophoretic display device of claim 10, wherein the surface area covered by the barrier layer is the same as the surface area of the protective layer, and the first optical adhesive is capable of absorbing the light of predetermined wavelength.

15. The electrophoretic display device of claim 10, wherein the surface area covered by the barrier layer is less than or equal to the surface area of the electrophoretic display component layer, and the first optical adhesive is capable of absorbing the light of predetermined wavelength.

16. The electrophoretic display device of claim 10, wherein the first optical adhesive or the second optical adhesive that is capable of absorbing the light of predetermined wavelength contains an ultra-violet absorber comprising $C_{17}H_{18}N_3OCL$.

17. The electrophoretic display device of claim 10, wherein the surface area covered by the first optical adhesive is the same as the surface area of the electrophoretic display component layer.

18. The electrophoretic display device of claim 10, wherein the surface area covered by the second optical adhesive is the same as the surface area of the barrier layer.

19. An electrophoretic display device manufacturing method, comprising:

disposing a bottom surface of an electrophoretic display component layer onto a surface of a substrate, a top surface of the electrophoretic display component layer having a first width;

disposing a first optical adhesive on the top surface of the electrophoretic display component layer;

disposing a bottom surface of a barrier layer onto the first optical adhesive;

disposing a second optical adhesive onto a top surface of the barrier layer;

disposing a protective layer onto the second optical adhesive, the protective layer having a second width, the second width being greater than the first width, wherein at least one of the first optical adhesive and the second adhesive is capable of absorbing light of predetermined wavelength;

utilizing a sealant to seal the sides of the electrophoretic display component layer, the barrier layer, and the protective layer onto the substrate; and exposing the sealant to the light of predetermined wavelength to cure.

20. The electrophoretic display device manufacturing method of claim 19, wherein the first optical adhesive disposing step comprises cutting the first optical adhesive and the electrophoretic component layer, so that the width of the first optical adhesive is identical to the first width.

21. The electrophoretic display device manufacturing method of claim 19, wherein the disposing step of the bottom surface of the barrier layer comprises determining the first optical adhesive capable of absorbing the light of predetermined wavelength when the width of the barrier layer is greater than the first width.

22. The electrophoretic display device manufacturing method of claim 19, wherein the disposing step of the bottom surface of the barrier layer comprises determining the first optical adhesive capable of absorbing the light of predetermined wavelength when the width of the barrier layer is less than or equal to the first width.

23. The electrophoretic display device manufacturing method of claim 19, wherein the disposing step of the second optical adhesive comprises cutting the first optical adhesive, the second optical adhesive, the barrier layer, and the electrophoretic display component layer, so that the widths of the first optical adhesive and the second optical adhesive as well as the barrier layer are the same as the first width.

24. The electrophoretic display device manufacturing method of claim 23, wherein the second optical adhesive is capable of absorbing the light of predetermined wavelength.

25. The electrophoretic display device manufacturing method of claim 19, wherein the disposing step of the protective layer comprises adjusting the second width to be the same as the width of the barrier layer, the first optical adhesive is capable of absorbing the light of predetermined wavelength.

26. The electrophoretic display device manufacturing method of claim 19, further comprising adjusting the width of the second optical adhesive to be the same as the width of the barrier layer.

* * * * *